United States Patent [19]

Phipps, III et al.

[11] 4,402,479
[45] Sep. 6, 1983

[54] SMALL TETHERED AEROSTAT RELOCATABLE SYSTEM

[75] Inventors: Joseph W. Phipps, III, Baltimore; Warren H. Jensen, Severna Park, both of Md.

[73] Assignee: Westinghouse Electric Corp., Pittsburgh, Pa.

[21] Appl. No.: 275,477

[22] Filed: Jun. 19, 1981

[51] Int. Cl.³ .............................................. B64F 1/14
[52] U.S. Cl. ................................................. 244/116
[58] Field of Search ..................... 244/115, 116, 33; 212/183

[56] References Cited

U.S. PATENT DOCUMENTS 3,631,988  1/1972  Noly ..................................... 212/183
3,905,567  9/1975  Menke et al. ......................... 244/115

FOREIGN PATENT DOCUMENTS 733801  4/1943  Fed. Rep. of Germany ........ 244/33
2055334 3/1981  United Kingdom ................ 244/115

Primary Examiner—Trygve M. Blix
Assistant Examiner—Rodney A. Corl
Attorney, Agent, or Firm—H. W. Patterson

[57] ABSTRACT

A tethered aerostat mooring apparatus for launching, maintaining aloft, and docking an aerostat that is readily foldable for ease of transport, and mounted such that the entire structure rotates on one axis to permit weather vaning of a deployed aerostat, and includes a flying sheave that rotates on an axis perpendicular to the first axis such that movement of the aerostat in azimuth maintains alignment with the fairlead of the sheave, thus providing ease of operation regardless of the dynamic movement of the aerostat.

1 Claim, 5 Drawing Figures

SMALL TETHERED AEROSTAT RELOCATABLE SYSTEM

BACKGROUND OF THE INVENTION

1. Field of the Invention

The present invention relates to tethered aerostats; and more particularly, to an improved mooring structure for maintaining the aerostat at the desired height in flight, to inhaul and outhaul its tether for launching and retrieving, and to provide a conductive path from a source of power to the aerostat.

2. Description of the Prior Art

The term "aerostat" as used herein refers to an inflatable, lighter than air structure that is preferably helium filled and capable of elevating and supporting communications equipment above the earth's surface. To provide the proper aerodynamics in elevating and maintaining such elevations, a typical aerostat has a dirigible-like configuration with a nose portion and stabilizing fins adjacent its tail.

Large aerostats have been in use for several years for the purpose of elevating communications equipment to altitudes in the order of 3000 to 4500 meters. Such aerostats are extremely useful for the purposes intended, but generally tend to be complex, expensive, and require an elaborate ground support system. There are many applications and missions where the elevation of an aerostat to approximately 750 meters above the earth's surface is adequate. For example, such elevation is satisfactory for increasing the range of radar border surveillance equipment, or as an aerostat platform for voice and data relay functions, where the communication range is in the neighborhood of 100 kilometers in radius, or as a communication relay between ground control stations and remotely piloted vehicles, or even for a rural telephone transponder where telecommunications requirements are limited and potential telephone subscribers are considerably spread out. One small aerostat platform operating at an altitude of 750 meters, for example, could provide telephone service via low cost radio units to subscribers as far as 110 kilometers from the aerostat.

To use a conventional large aerostat for such applications is unnecessarily expensive including the cost of the ground handling equipment as well as the inherent limitation of a non-mobile system. Even by reducing the overall size of such aerostats, the available apparatus for mooring, inhauling and outhauling still involve a similar degree of complexity.

Therefore, it is desirable to provide tethered aerostat apparatus that has all of the advantages of the conventional aerostat, with the exception of altitude but which is less expensive to manufacture, locate, and operate. Such tethered aerostat system should be adaptable to a wide range of missions and provide flexibility of operation at a cost much less than the conventional systems.

SUMMARY OF THE INVENTION

In accordance with the present invention, the tethered aerostat system is provided that comprises a bearing assembly that is fastened to a deck or platform so that the bearing rotates about an axis perpendicular to such platform. A second platform is fastened intermediate its ends to the bearing to rotate about its axis in a plane substantially parallel to the deck or first platform. The movable and stationary portions of the bearing assembly include slip rings to conduct electrical energy from a power source located on the ground or on the first platform to the tethering line. A tower is hingedly mounted on the second platform to extend substantially parallel to the axis of the bearing when in an erect position a sufficient distance to provide a slight clearance between the aerostat and the first platform when it is in a moored inflated condition. The tower may be folded on its hinges in order that it may be easily transported on a public highway or in the case of a ship may be folded downwardly when passing beneath bridges or other obstructions. Fastened adjacent the base of the tower is a horizontal boom member that is positioned to extend in a direction normal to the axis of the tower and the bearing assembly. The second platform has mounted thereon a winch for inhauling and outhauling the aerostat and is mounted on the opposite side of the tower such that it weight tends to act as a counterweight for the boom. Also mounted on the rotatable platform is an operator's console for controlling the inhauling and outhauling of the aerostat. Adjacent the free end of the boom are a pair of outrigger support arms that are mounted on hinges to be swung outwardly and locked in position to support the aerostat in a closely hauled aligned position relative to the second platform. The outrigger arms each have a hydraulic winch at their free ends to assist in close hauling the aerostat. The free or after end of the boom also includes a rear flying sheave. The flying sheave is a pulley that rotates about a substantially horizontal axis where the pulley is mounted to swing on an axis substantially normal to the axis of the main bearing. Such an assembly shear effects the proper lead angle of the tether while launching, flying or docking the aerostat. The entire second platform rotates 360° to permit weather-vaning of the aerostat into the wind; and yet the entire system is portable and readily deployable.

DESCRIPTION OF THE PREFERRED EMBODIMENT

Figure 1:
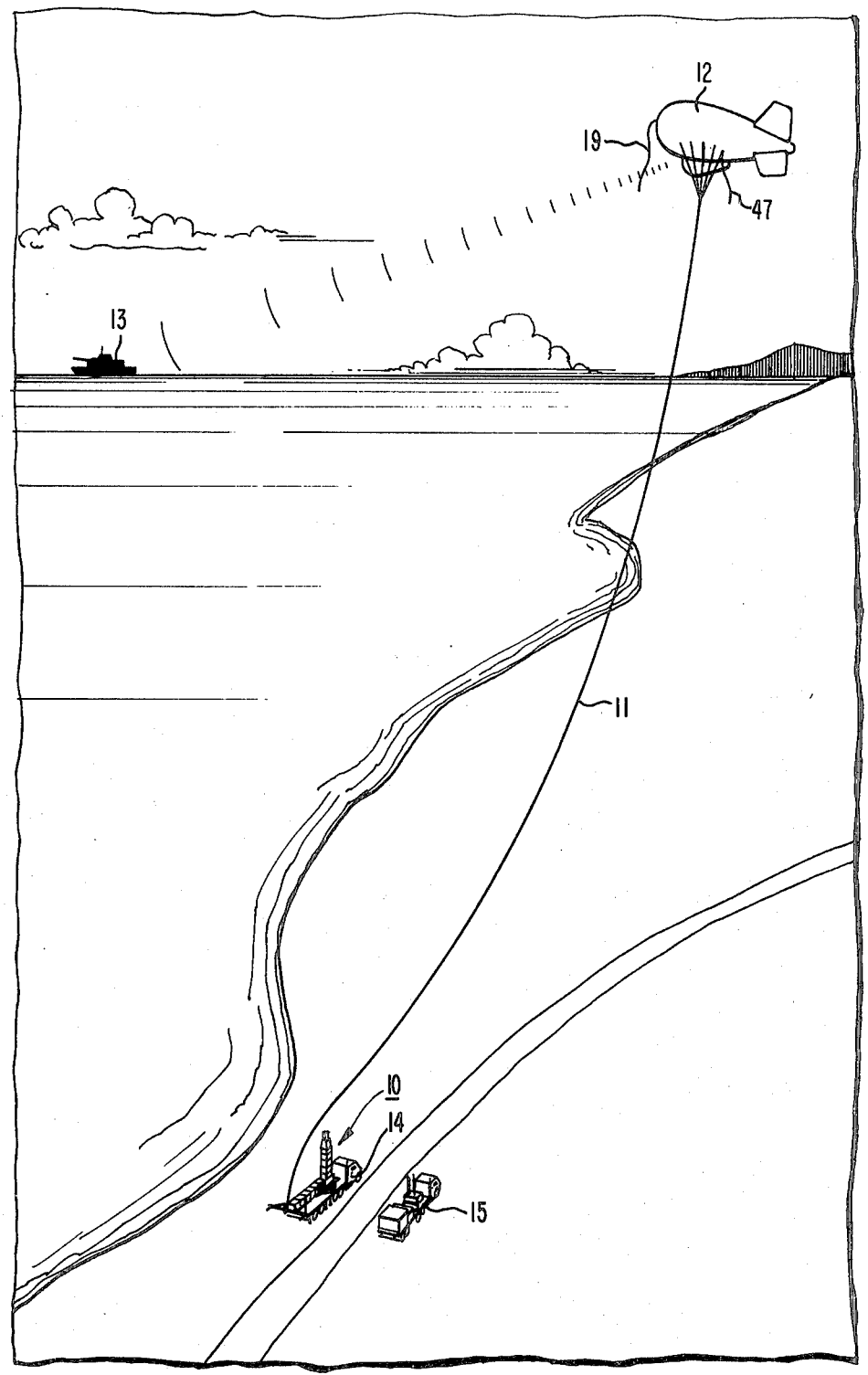
FIG. 1 is a pictorial representation of a mooring apparatus with a tethered aerostat in operative position.

Referring to FIG. 1, a mooring system, or apparatus 10 which is used to maintain, and inhaul and outhaul an aerostat 12, connected to a tether 11 is illustrated performing its function of maintaining the tether at the desired length in flight in order to increase the range of communication equipment carried by the aerostat to a ship such as 13 that would otherwise be out of line of sight. As is shown in FIG. 1, the aerostat 12 maintains its position above the launch point by means of the tether 11 which is a single cable. The tether 11 not only anchors the aerostat in place but also provides electrical power to the airborne components (not shown) via electrical conductors embedded in the tether. In addition, the tether provides a secure communications path between the aerostat and the ground control equipment via optical fibers integral to the tether 11. The details of construction of the tether form no part of the present invention, and such tether has been offered for sale and is in use more than one year prior to the filing of this application. As shown in FIG. 1, the tether 11 is connected to the assembly 10 that is mounted on a flatbed of a trailer truck 14. A trailer truck 15 forms no part of the present assembly but it may be utilized as a support vehicle in that it carries an electrical generator, helium, fuel supplies, and a shelter which serves as the system operations room if desired.

Figure 2:
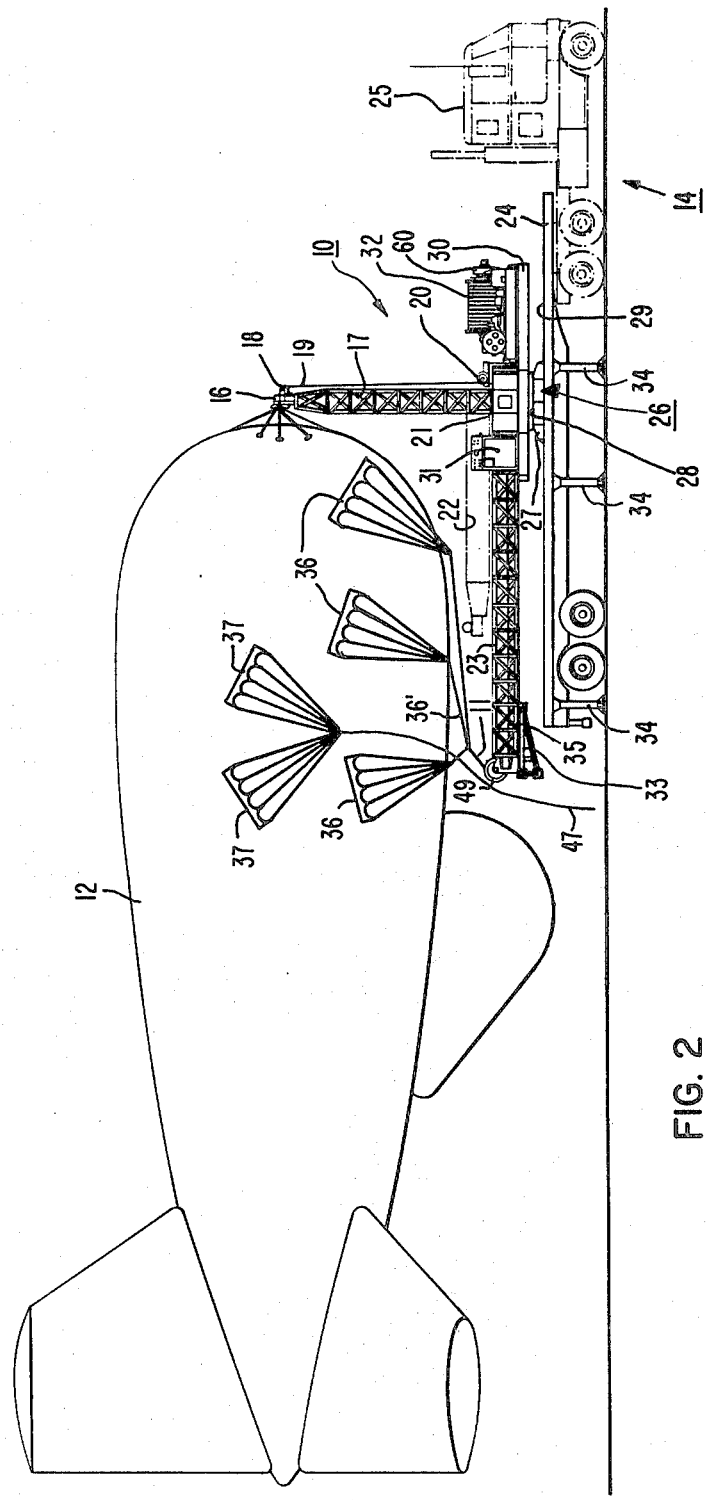
FIG. 2 is a view in elevation showing an inflated tethered aerostat moored to the apparatus of the present invention.

Referring to FIG. 2, the aerostat 12 is shown in an inflated and moored position to a nose portion 16 of a tower 17. The aerostat 12 is secured by a nose line 19 that extends through a pulley 18 to a winch 20 that is used for paying in or letting out the nose line 19 when docking or undocking. The tower 17 is hinged adjacent a point such as 21 so that it can be tipped on its side to a position outlined by alternately dashed and dotted lines 22. A boom 23 is fastened at one end adjacent a base of the tower 17 and extends normal to the axis of such tower. A flatbed trailer 24 serves as a base or platform for the assembly 10 and is removably attached to a cab 25 of the trailer truck 14 for transporting the apparatus 10 together with the aerostat 12 either in an inflated or deflated condition. When inhauling and outhauling, or when the aerostat 12 is in the position as shown in FIG. 2, the cab 25 may be removed from the flatbed trailer 24.

A bearing assembly 26 having a lower portion 27 (FIG. 3 and 4) and an upper portion 28 which are rotatable relative to one another. The lower portion 27 is attached to upper surface 29 of the flatbed trailer 24 in a conconventional manner. A second platform 30 is mounted on the upper portion 28 of the bearing 26, and thus is rotatable 360° about the bearing axis that extends normal to the plane of the trailer surface 29. The second platform 30 is substantially parallel to the surface 29 of the platform 24. As shown in FIGS. 2 through 5, the tower 17, the boom 23, an operator's console 31 and a main winch 32 are all securely attached to the platform 30. The boom 23 has an after portion or free end, on which are mounted foldable outriggers 33, for maintaining the aerostat 12 closely hauled and aligned with the axis of the boom 23. Stabilizing jacks 34 are used to securely rest on the ground surface, or may be in the form of an auger that anchors the trailer platform 24 securely to the ground for operation. Each one of a pair of close haul winches 35 mounted on the outer ends of foldable outriggers 33 adjacent the after end of the boom 23 to manuever and align the aerostat 12 by way of lines 47 to securing straps 37 of the aerostat 12. Such lines 47 are illustrated as hanging free in FIG. 2.

Figure 3:
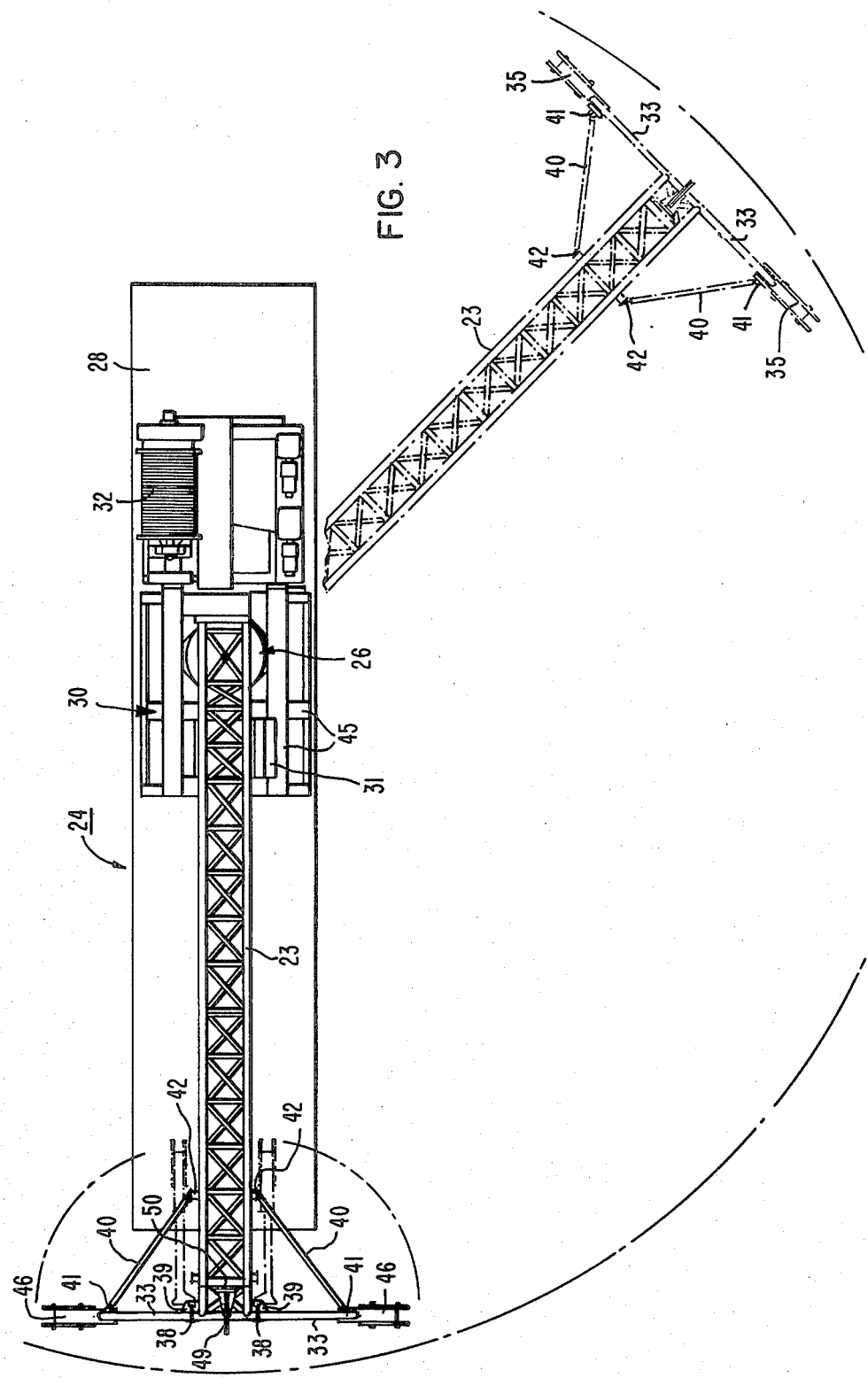
FIG. 3 is a plan view of the mooring apparatus of the present invention illustrating the outriggers at the after end of the boom in an extended position.

Referring to FIG. 3, the plan view of the mooring system 10 is shown with the boom 23 both in alignment with the long dimension of the trailer 24 and in phantom in a rotated position that could typically be a position of operation depending upon the direction of the wind. The outriggers 33 are hinged at 38 to supports 39 so that they may be folded forward to be within the side edges of the surface 29 of the trailer bed 24 for transporting the assembly. In operative position, the outriggers 33 are swung on their hinges 38 rearwardly to extend normal to the longitudinal axis of the boom 23. Metallic rods 40 are fastened at 41, to one end of outrigger 33 at one side of the boom 23 and to a similar portion 41 of the other outrigger 33 at the other side of the boom 23.

The other end of the rods 40 are attached to opposite sides of the boom 23 at 42. The close haul winches referred to at 35, which are operated hydraulically in a conventional manner by hydraulic lines extending interior of the boom 23 serve to maintain the aerostat 12 in a close hauled or aligned position by taking up on the lines 47 (FIG. 2) that are connected to the after or close haul patches 37. The rotatable platform 30 on which the tower 17, the boom 23, the operator's console 31, the winch 20, and the main winch 32 as well as other apparatus hereafter described, are mounted, is preferably constructed of metallic members such as 45 that are suitably welded or bolted to form a frame on which the apparatus is mounted. Of course the platform itself is mounted on the rotatable bearing member 28 as previously described. The boom 23 is rectangular in cross-section and is constructed of a plurality of crossed angles in a well known manner to provide structural strength to the boom.

A flying sheave assembly 49 includes a bearing 50 which may be a conventional well known type referred to as "Rotek", which is merely a ball or roller bearing assembly having a base portion 51 fastened to the rear or outer end of the boom 23 and a rotatable portion 52 on which frame member 53 (FIG. 4) is mounted to rotate about an axis that is substantially normal to the axis of the main bearing assembly 26. The bearing 50 is thus positioned so that the flying sheave assembly rotates about such axis which is also parallel to the longitudinal axis of the boom 23 and the surface 29 of the platform 24. Attached to the movable portion 52 of the bearing is the frame 52 a pair of spaced side plates for supporting a bearing assembly 54 for the pulley 55. The pulley or sheave 55 preferably has a conventional fair-lead attached to its periphery in a conventional manner for more accurately and securely guiding the tether. A counterweight 56 (FIG. 4) is mounted between the side plates 53 to maintain the sheave assembly 49 in an upright position with the axis of the sheave or pulley 55 substantially horizontal. The tether 11 extends from the winch 32 and through a level winding mechanism 58 and through the interior of the boom 23 to its after end, and then around the pulley 55. The movement of the aerostat 12 while aloft or during inhauling or outhauling may cause at time substantial movement of the tether 11 relative to the horizontal. The sheave assembly 34 is free to rotate about the horizontal or longitudinal axis of the boom, and of course the entire mooring structure 10 is free to rotate about an axis perpendicular to said longitudinal axis.

Figure 4:
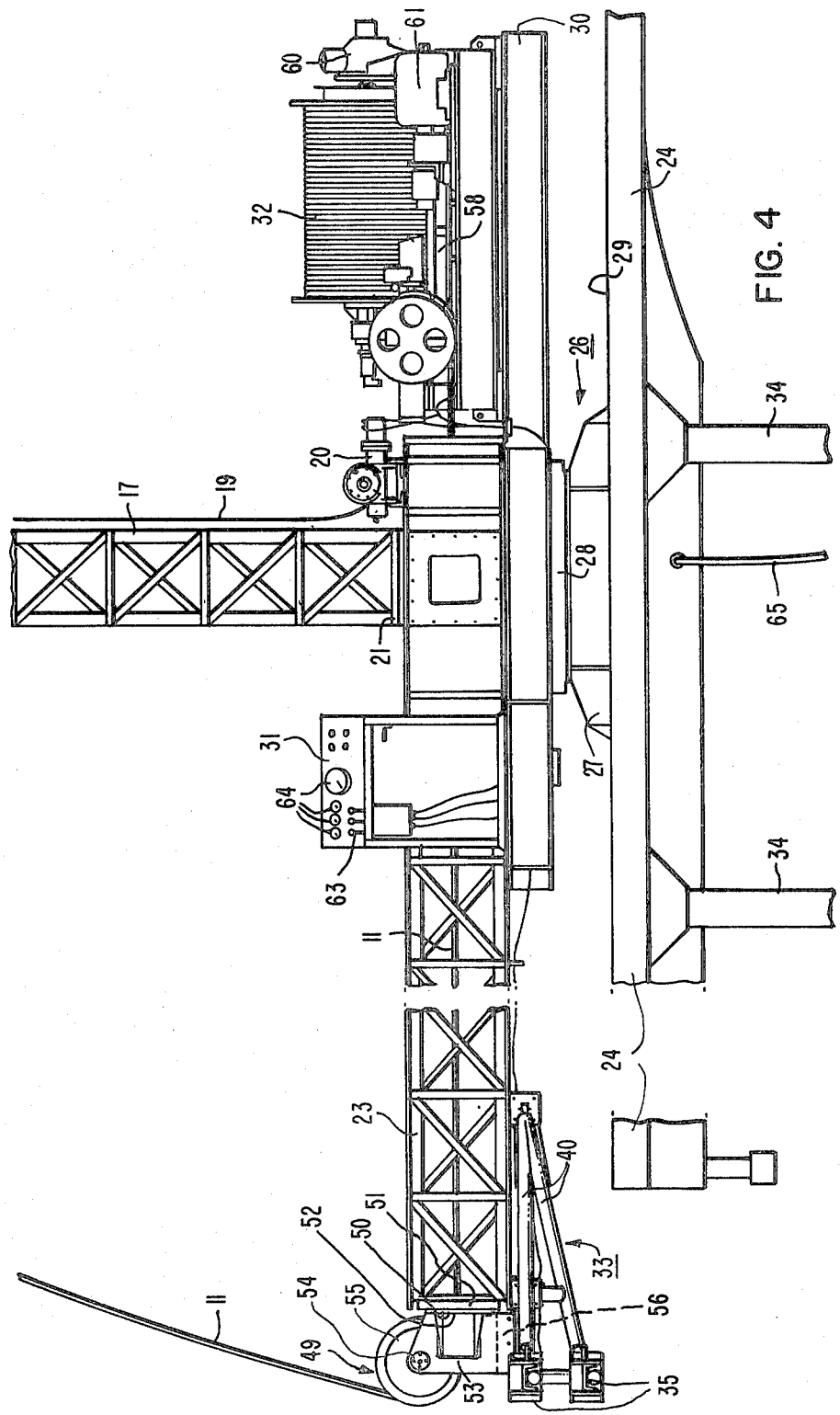
FIG. 4 is an enlarged fragmentary view in elevation of the mooring apparatus of the present invention.
Figure 5:
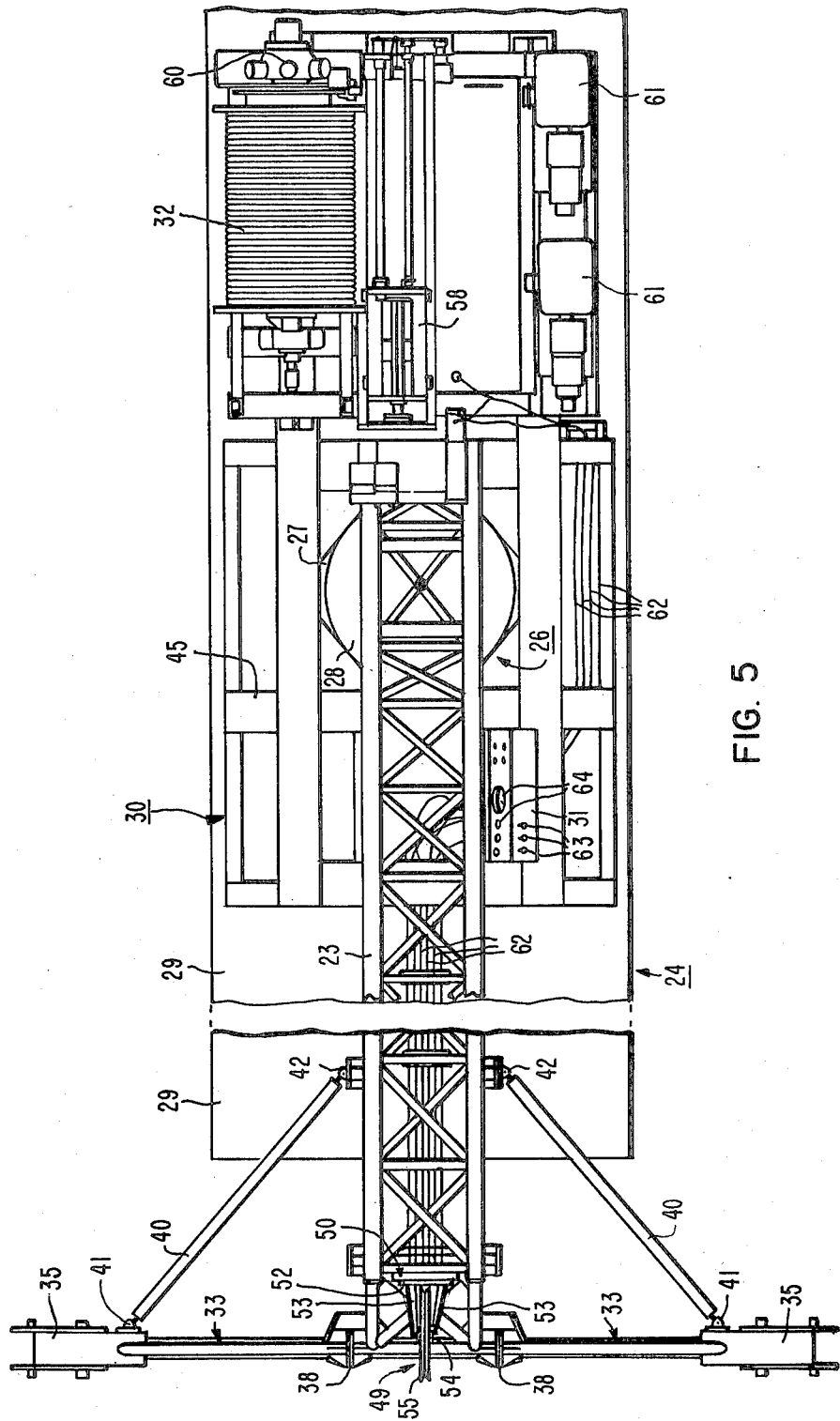
FIG. 5 is an enlarged plan view of the apparatus of the present invention with the tower removed to illustrate the main bearing assembly.

Referring to FIGS. 4 and 5, the winch 32, is operated by a hydraulic motor 60, with the power supplied by pump 61. The close haul winches are operated by suitable hydraulic motors through hydraulic lines 62 that extend beneath the platform 30, suitably connected to the underside thereof, and then run aft, suitably connected within the boom 23, and then outwardly along the outriggers 33 to the winches 46. The power is supplied by hydraulic pump 61. Also as shown in FIGS. 4 and 5, the operator's console 31 includes a plurality of levers for operating the winches 20, 32, and 35 and gauges 64 for indicating the number of meters that the tether 11 has been payed out, the thether tension, as well as gauges to indicate hydraulic pressure for inhauling and outhauling of the aerostat 12. Electrical power for operating the winches and other apparatus mounted on the platform 30 is conducted from a stationary source in a cable 65 (FIG. 4) and then to suitable slip rings (not shown) in the bearing assembly 26; and then from the movable slip rings to the various apparatus mounted on the platform 30. If required, slip rings are also provided between the stationary and movable portions of the winch 32 to conduct any power required to the tether 11. Other details associated with the structure of the apparatus of the present invention will be described in connection with a description of its operation.

In operation, the apparatus 10, if a tractor trailer truck, as shown herein, is preferably positioned near the center of a clearing approximately 200 feet square. The exact location of the trailer 14 is not critical but it should be far enough from the edge of any clearing to insure the free rotation of the boom 23 on the aerostat 12 when moored to the tower 17. Once the mooring trailer 14 is positioned, the leveling jacks 29 lowered in place and adjusted in a well known manner to level the platform 24. During the leveling procedure, the tractor 25 may be detached from the trailer 14 and move to a convenient spot away from the mooring position. Next, the aerostat 12 in a deflated condition is spread to cover a cleared inflation area. The mooring tower 17, which is hinged at 21 for example, and folded downward for transport is then winched or otherwise lifted to a vertical position and bolted in place. The nose line 19 from the aerostat nose cone is then run through the nose cone latch 16, the pulley 18, and down the tower 17 to nose mooring winch 20. At this point, the aerostat 12 may be inflated at the fastest possible rate with the nose line rigged to lift the nose cone a few feet off the ground, and with the close haul lines 47 in position for fastening. The outriggers 33 should then be swung outwardly and locked in position by the clevis bars 40. During inflation, the aerostat 12 should be in a slightly nose-up position with the nose line 19 taut and both close haul lines 47 taut. Also, as the confluence line load patches 36 come into view attach the suspension lines 36' should be secured to the mounting points of the patches. With the aerostat 12 pressurized, attach the confluence or suspension lines to the main tether 11 while allowing the aerostat 12 to rise equally on all both close haul lines 47 until the equipment to be carried aloft can be positioned beneath the aerostat 12 and secured in place. When the aerostat has risen sufficiently, the power and other cables may be connected so that the tether 11 can power the system. When the aerostat 12 has its nose latched in place at the top of the tower 17, the close haul lines 47 are then operated to hold the aerostat 12 in approximately a level attitude. Then the mooring boom 23 should be rotated until it is beneath the aerostat 12 in order to connect the ends of the close haul lines 47 to the close haul winches 46. The close haul winches 46 are then used to finally maneuver the aerostat into the mooring position. With the aerostat 12 safely moored, the entire system may then be checked, after which it is ready for outhauling. During outhauling, the nose cone of the aerostat is unlatched; the close haul lines 47 slackened, and the winch 20 operated to permit the tether 11 to be payed out. While the aerostat 12 is being outhauled, the entire assembly 10 is free to rotate so that regardless of the direction of the wind or a shift therein, the control is the same. Once the aerostat 12 has reached the proper altitude, the winch 32 is locked in a well-known manner and the entire system is assumed to be in operation.

During operation, the entire platform 30 and equipment thereon is free to rotate or swing in any direction to any degree; and of course, it should be noted in accordance with the present invention that the flying sheave 55 may also freely rotate about its horizontal axis that is substantially parallel to the longitudinal axis of the platform 30 and perpendicular to axis of the assembly 10. If it is desired to move the entire assembly 10 while the aerostat is aloft, and the ground restrictions permit such movement, the tractor 25 may be readily hooked to the trailer 14 and the entire assembly may become mobil. In inhauling the tether 11 and the aerostat 12, the procedure for deployment is merely reversed; and the system may be packed up and prepared for operation on a normal highway or desired relocation.

Thus, we have provided an improved tethered aerostat relocatable system which is so constructed that it can be mounted on a permanent base such as a flatbed highway truck trailer, the deck of a ship, or even for helicopter lift; and is relatively low cost and easy to use.

We claim:

1. Apparatus for controlling an aerostat, said aerostat having a nose line, a tether line and close haul lines, said apparatus comprising
   a first platform having an upper substantially plane surface,
   a second platform mounted rotatably above the upper surface of the first platform to rotate about a main axis that extends substantially perpendicular to said surface,
   a launching tower fastened at its base to the rotatable platform, said tower having an upper end for securing the aerostat at its nose,
   a boom having an inner and outer end portion fixedly mounted on the second platform with its inner end adjacent the base of the tower,
   a sheave assembly mounted rotatably adjacent the outer end portion of the boom to rotate about an axis substantially normal to the main axis of the second platform and substantially parallel to the longitudinal axis of the boom, said assembly having a pulley mounted to rotate about an axis normal to the axis of the sheave assembly and the second platform and the longitudinal axis of the boom, said assembly having a counterweight attached to the assembly and spaced from the axis of the assembly to maintain the axis of the pulley substantially horizontal,
   a main winch mounted on the second platform adjacent the tower base and the inner end of the boom to pay in and pay out the aerostat tether about the pulley,
   a pair of outrigger members adjacent opposite sides of the outer end of the boom, said members being foldable inwardly adjacent the boom and outwardly at opposite sides of the boom for launching and docking the aerostat, said outrigger members each having a close haul winch at their outer ends for close hauling via the close haul lines the aerostat moored to the tower via its nose line, and
   a control station mounted on the second platform having means for operating the winches.

* * * * *